March 31, 1936.  C. SMITH  2,035,512
RELIEF VALVE
Filed Jan. 14, 1929  2 Sheets-Sheet 1

Inventor:
Chetwood Smith
By George Crumptaugh.
Attorney

March 31, 1936.   C. SMITH   2,035,512
RELIEF VALVE
Filed Jan. 14, 1929   2 Sheets-Sheet 2
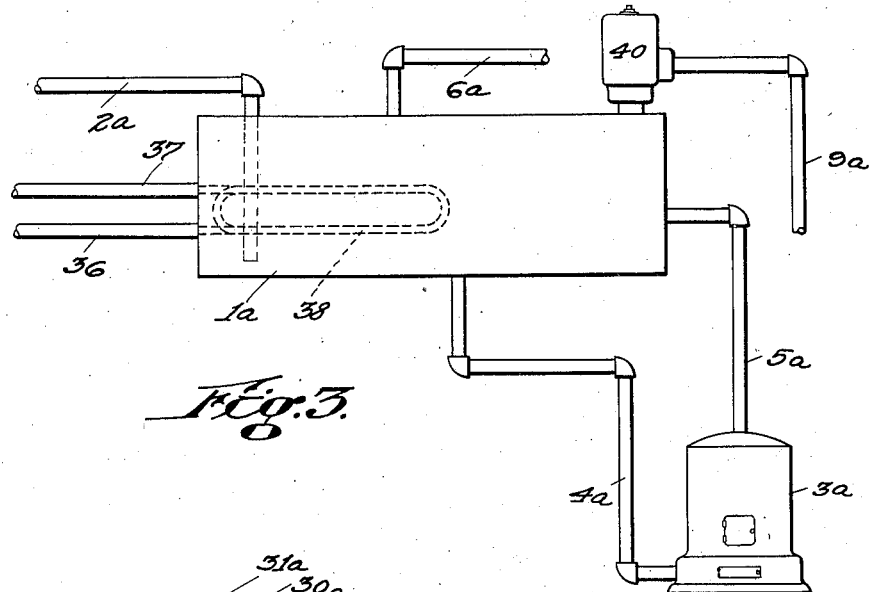
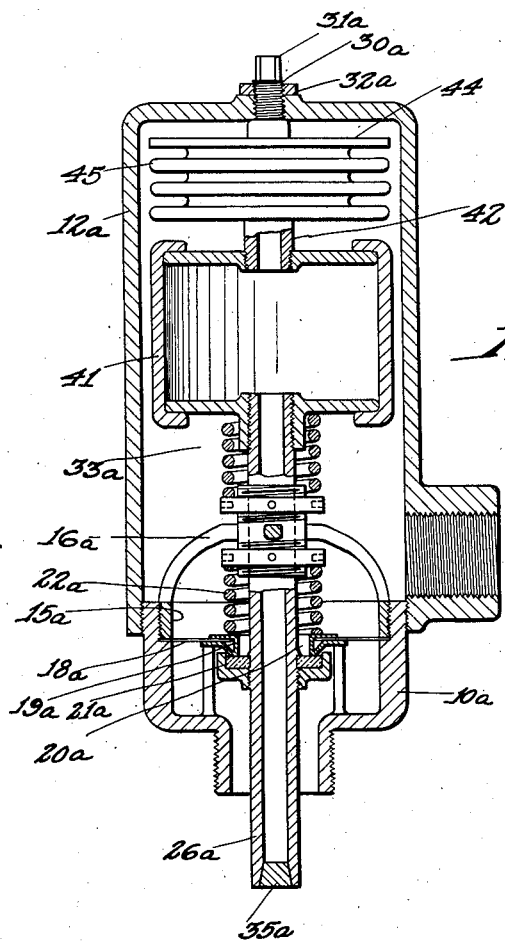
Inventor:
Chetwood Smith
By George Compton Jr.
Attorney Patented Mar. 31, 1936

2,035,512

UNITED STATES PATENT OFFICE 2,035,512

RELIEF VALVE

Chetwood Smith, Worcester, Mass.

Application January 14, 1929, Serial No. 332,278

39 Claims. (Cl. 137—139)

The invention relates to relief valves for hot water supply or heating systems, and in some respects is an improvement upon the relief valve shown in my prior Patent No. 1,688,092, granted October 16, 1928, although in other respects it represents a complete reorganization involving a relief valve having greater capabilities than that of my aforesaid prior invention.

The necessity for relief valves in hot water heating and supply systems arises from the fact that otherwise the only relief provided is in the form of a faucet or other manually operated valve. Besides the obvious necessity of providing relief from excessive pressures on the system, there is the ever present danger of explosions when steam temperatures occur. The fundamental object of the invention, therefore, is to provide a valve which will relieve the system in case the temperature of the water therein reaches or nearly reaches the boiling point.

For commercial reasons it is desirable to provide a valve which will operate equally well under the different pressures which may be found in different municipal or town water supply systems, and therefore an important object of the invention is to provide a relief valve which will relieve at substantially the same temperature irrespective of the pressure on the system. According to the invention, as hereinafter disclosed, this may be accomplished in two different manners.

According to one form of the invention, a liquid is inclosed in a chamber and subjected to the same pressure as the water in the system and the boiling of the liquid in the chamber operates the relief valve. Inasmuch as the boiling point of most liquids, like that of water, varies for different pressures, the functioning of this apparatus would take place at different temperatures, except for the provision of the additional mechanism which I have provided. To overcome the above difficulty, I have added to the pressure which the system creates upon the liquid in the chamber a comparatively great constant force, so that the proportionate change of pressure will be small although the absolute change will follow that of the system. The addition of this constant force to the variable pressure has the further effect of greatly increasing the pressure on the liquid in the chamber, and as it is well known that the variation of the boiling point of liquids is less at the higher pressures, this factor further reduces the ultimate proportional variation of the boiling point in the liquids which are inclosed in the chamber. Of course it is necessary to select a liquid which boils at low temperatures under atmospheric pressure, in order that it may boil at or near 212° when subjected to the additional pressure. The normal atmospheric boiling point of water is a critical point for the reason that, although the water may not boil in the system when under pressure at this temperature, yet the opening of a faucet causes it to expand into live steam.

According to the second form of the invention, which as hereinafter described may be incorporated with the first form if desired, the actual volumetric expansion of the liquid is used to open the relief valve, and as this liquid expansion is very slight in amount, I have devised means for magnifying it, which will hereinafter appear.

In both forms of the invention I have illustrated a further means for relieving from excessive temperatures under very abnormal conditions such as the breakage of a live steam coil in the storage tank, and this involves a fusible plug which opens the relief valve wide and with a very quick action.

The foregoing and ancillary objects of the invention will hereinafter more fully appear from the following detailed description, taken in connection with the accompanying drawings, in which—

Fig. 3 is a representation for illustrative purposes of a slightly different hot water system showing the device of the invention applied thereto.

Fig. 4 is a vertical sectional view through a modified form of relief valve.

Like reference characters refer to like parts throughout the drawings.

Figure 1:
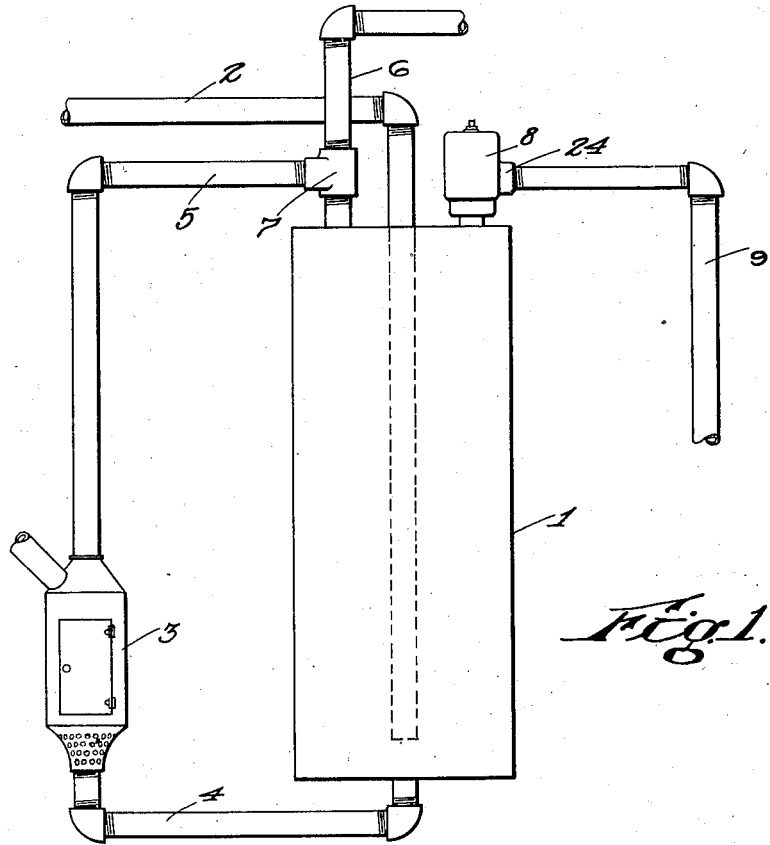
Fig. 1 is a representation of a hot water system, showing the device of the invention applied thereto.

Referring first to Fig. 1, a hot water supply system in connection with which the apparatus of the invention is shown by way of example involves a storage boiler 1 into which a supply pipe 2 leads. The pipe 2 preferably extends practically to the bottom of the tank 1, so that the incoming cold water will be delivered to the boiler 1 at the bottom thereof. It should be understood that the pipe 2 may be considered as supplied from any municipal, town, or other desired source of water supply the pressure on which, due either to gravity or force pump feed may vary widely from one locality to another and may even vary widely in the same system at different times.

A heating unit is indicated at 3; said heating unit may consist of a spiral coil past which a gas flame is directed, or it may be of any other type. Piping 4 connects the bottom of the boiler 1 with the bottom of the heating unit 3, while piping 5 connects the top of the boiler 1 with the top of the heating unit 3. As is well known, when the heating unit 3 is in operation convection causes a circulation of water from the bottom of the boiler 1 by way of the piping 4, through the heating unit 3 and into the top of the boiler 1. The service piping 6 which leads the heated water to the place where it is to be used is desirably shunted into the piping 5 as by means of a T head union 7 in order that the hottest water may be conveyed away to the service.

The device of the invention is indicated generally by the numeral 8 and may be located at any convenient place preferably on or near the top of the boiler 1. It functions to allow water or steam to be drawn off from the boiler 1 under conditions of excessive pressure or excessive temperature from any cause, the water passing off through piping 9 leading to a drain, or any other place where it may waste.

Figure 2:
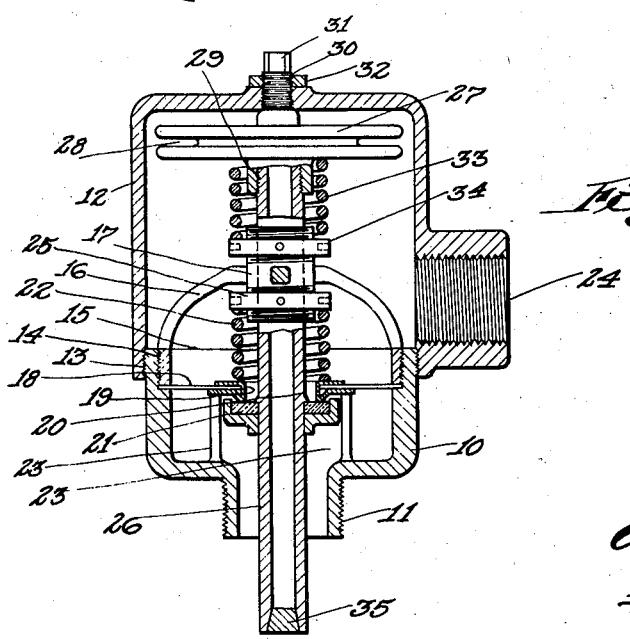
Fig. 2 is a vertical sectional view through a relief valve constructed in accordance with my invention.

Referring now to Fig. 2, the apparatus of the invention may be conveniently inclosed in a casing comprising a lower member 10, providing screw threads 11 for attachment to the boiler 1, and an upper member 12 which fits in screw threaded engagement with the member 10, the screw threaded union being indicated at 13. The member 10 provides internal screw threads 14 into which is screwed the annular portion 15 of a cage 16. The arms of the cage 16 support a somewhat smaller annular portion 17 located preferably about in the center of the device and by means of which the thermal and valve element of the apparatus is supported.

Extending inwardly from the cylindrical wall of the lower member 10, and conveniently held in place by the annular portion 15 of the cage 16 is a diaphragm 18. This diaphragm provides an annular floating seat 19 surrounding an orifice 20; the seat 19 is held with the desired amount of pressure against a disk valve 21, which so far as the pressure responsive operation of the device is concerned may be considered stationary, by means of a spring 22, the reacting thrust of which is received by the cage 16. To prevent downward movement of the seat 19 under the influence of the spring 22, stops 23 are provided.

It will readily be seen that whenever the pressure of the water in the system for any cause rises beyond a desired amount, the diaphragm 18 will be forced upwardly and the water will be allowed to waste through the passage or port in a threaded boss 24 that is provided for the attachment of the pipe 9. It will further be readily seen that the functioning of the device to relieve against excessive pressure in no wise prevents the resumption by the parts of their original position, and thus it is not necessary to do anything to my apparatus after it has functioned to relieve against excessive pressure, as aforesaid. In order to adjust the valve to relieve at the desired pressure, an adjustment nut 25 is provided, in engagement with a screw threaded portion of the annular portion 17 of the cage. This nut 25 takes the reacting force of the spring 22.

The disk valve 21 is directly connected to a tube or hollow member 26, which constitutes one of the movable parts of the thermal element of my invention. The interior of the tube or hollow member 26 communicates at the top with the inside of a spring bellows device 27. The said spring bellows device is made of some resilient metal, comprises a completely closed chamber, and is preferably corrugated as shown in Fig. 2 at 28 in order that it may expand. The bellows device 27 may be attached to the top of the hollow member 26 as by means of screw threads 29, or in any other desired manner, it being understood that the union must be pressure tight, which may be effected by soldering. Integrally attached to the top of the bellows device 27 is an adjustment screw 30 providing means to turn it, such for example as a hexagonal head 31, the said screw being in threaded engagement with an internally threaded portion of the upper casing 12 as shown. Once the desired tension has been established, the parts can be locked in position as by means, for example, of a check nut 32. A constant tension is exerted upon the bellows 27 by means of a spring 33 backed by an adjustment nut 34. A fusible plug 35 completes the apparatus in this embodiment of the invention.

From what has already been said the functioning of the apparatus will be apparent, but briefly, assuming the bellows 27 and hollow member 26 contain a quantity of the desired liquid, whose boiling point will not be in the neighborhood of 212° Fahrenheit except under considerable pressure (such liquid might be wood alcohol) it will be apparent that this liquid is under constant pressure due to the tension of spring 33, and that vaporization thereof is resisted by the additional pressure due to the upward thrust of the member 26 resulting from the pressure in the heating system on the area of the port 20, this variable pressure being diminished by the difference between the area of the port 20 and of the bellows 27. The variable pressure is thus greatly reduced in amount, from the difference in diameters and consequently areas between the relief valve opening and the bellows 27, this reduction being in the ratio of the respective areas and consequently a considerable variation in pressure in the system due to any cause will result in a very small variation of the pressure on the diaphragm proportionate to the total pressure thereon including that of the spring 33. A liquid having been chosen which, under the constant pressure of the spring plus the greatest variable pressure which may be expected to occur in practice, will boil at 212°, it is apparent that once dangerous temperatures are for any cause brought about in the boiler 1, the liquid inside the tube 26 and the bellows 27 will boil, thus expanding the said bellows 27 and forcing the valve 21 downwardly, which will allow the overheated liquid to flow outwardly through the pipe 9. It is apparent that substantial restoration of normal conditions will restore the device to its original position without any attention on the part of anyone.

In case of a violent generation of steam temperature conditions within the tank 1 from any cause, as for example, by reason of the pressure in the bellows not being sufficient to operate the valve 21, the plug 35 will be fused and this will allow the pressure in the boiler to reach directly into the bellows 27 thus opening the valve device wide. On the occurrence of such an event, the device will have to be replaced or have a new plug 35 inserted therein.

It will be noted that the member 26 extends downwardly into the water of the heating system itself, and thus the relief valve of the invention can be applied practically anywhere in the system that the boiler temperature can reach and nevertheless it will present the advantage of free circulation of the water in and around the thermal element of the device, so that no stagnant condition may arise to prevent the proper functioning of the apparatus.

Referring now to Figs. 3 and 4, the relief valve therein illustrated presents all the capabilities of the relief valve just discussed, but it presents additional features and modes of operation not contained in the apparatus just described. The boiler 1a illustrated in Fig. 3 may be of any suitable type, and in fact the illustration of two different kinds of heating systems in connection with which the several apparatus of the invention have been shown is not intended to limit the invention thereto, it being understood that it can be applied to any system where found useful. In similar fashion the supply pipe 2a is or may be the same as the supply pipe 2 of Fig. 1; the heater 3a illustrated is a coal burning heater and is connected by pipes 4a and 5a to the boiler 1a. The numeral 6a represents the service pipe, and 9a the piping leading to waste to convey away the water or steam in case the relief valve of the invention operates. The numerals 36 and 37 represent the inlet and outlet pipes for a steam coil 38, this being one method of heating the water and one which necessitates an efficient relief valve in case the steam coil breaks.

The relief valve illustrated in this modified form of the invention is generally indicated by the numeral 40, and referring now to Fig. 4, it may be conveniently enclosed in a casing comprising a lower member 10a and an upper member 12a of substantially the same construction as that already described in connection with Fig. 2. A cage 16a is provided having an annular portion 15a by which it may be attached to the casing 10a, and below this is a diaphragm 18a supporting the valve seat 19a which is in engagement with a valve 21a closing a relief port 20a, as in the form of the invention just described. A spring 22a provides the pressure which the system must overcome to allow relief for excessive pressure, while the disk valve 21a is attached to a hollow member 26a likewise as already described. Attached to the top of the hollow member 26a and in communication with the interior thereof is a chamber 41, constituting with the hollow member 26a in effect a single hollow member, which may be constructed in any desirable manner so long as it is liquid tight and presents rigid walls. Attached to the top of the chamber 41 by means of a boss 42 having liquid tight engagement with the top of the said chamber 41 is a bellows device 44 which has a general resemblance to the bellows 27 but desirably provides a greater number of convolutions 45. The top of the bellows device 44 provides a screw 30a by which it is adjustably attached to the casing 12a involving the hexagonal head 31a and check nut 32a as in the other form of the invention.

The entire unit comprising the chamber 41 and the bellows 44 is pressed upwardly by the constant force involving the use of a spring 33a as in the other form of the invention, and from the similarity of parts, the only change being in the greater volumetric capacity of the inclosure for the liquid, it will be apparent that the apparatus shown in Fig. 4 will operate in exactly the same manner, if desired, as that of the apparatus previously described. However, the chamber 41, bellows 44 and tube 26a is in this embodiment filled with a liquid nearly but not quite up to the top, there being a vacuum of small but definite volume included within the system instead of just atmospheric air above the liquid. The apparatus is so adjusted that expansion of the liquid within the thermal unit of the device will cause said unit to be completely filled at that temperature at which it is desirable to first cause the relief opening 20a to be opened. Expansion of liquids due to rise in temperature is very small in amount, but by the inclusion of a great volume of liquid in the apparatus, a small relative expansion can, as herein shown produce an appreciable linear movement. Nevertheless, in order that the valve may open wider in case sufficient relief is not afforded by the opening of the disk 21a due to the volumetric expansion of the liquid therein, the apparatus herein disclosed incorporates the other features common to that disclosed in connection with Fig. 2, and consequently the valve of the present embodiment of this invention provides three separate means of relief from excessive temperatures, since it incorporates the fusible plug 35a at the bottom thereof. Thus the apparatus of the present embodiment of the invention may be so arranged and adjusted as to open a small amount, for example at 200° Fahrenheit, and a further and greater amount for example at anywhere from 205° to 212° and finally it may be arranged to open wide upon the attainment of dangerous temperatures such as 225° or 230°. In addition it will be seen that the valve will open from excessive pressure in exactly the same manner in which the valve in Figs. 1 and 2 open.

It should be explained that in connection with the form of the apparatus illustrated in Fig. 4, it is not necessarily important that the spring 33a be used. This is because the valve of Fig. 4 is arranged, by reason of the volumetric expansion of the liquid in the thermo element, to open at a definite minimum pressure, and therefore in this form of the invention, it is not so important that the further and greater opening in response to gasification of liquid in the thermal device should occur within any such close range of temperatures as is provided for in the case of the apparatus shown in Fig. 2. At least the spring 33a may be used or dispensed with according to the particular requirements of the system into which my relief valve is to be incorporated. It should be further understood that the spring can have no effect upon the liquid in the tube 26a, chamber 41, and bellows 44, until the liquid inside has completely filled these parts and started to open the valve 21a, since prior to that time there is a partial vacuum in the system and the spring 33a would simply be exerting its tension against the spring 22a. The bellows device 44 is larger than the bellows device 27 in order that it may be capable of greater expansion, for in this embodiment of the invention the thermal elements are, just prior to the boiling of the liquid, completely filled, and consequently tremendous pressures would be generated if a much greater space could not be immediately provided for the vapor.

It should be noted that in both forms of the invention the valve disk 21 or 21a is held against the seat 19 or 19a not only by the pressure of the spring 33 or 33a, but that the pressure on the fluid in the boiler 1a is acting against the disk valve to keep it closed, and thus the device will not leak under ordinary conditions. It should be noted further that in the case of the modified form of the invention illustrated in Fig. 4 that the partial vacuum in the bellows 44, chamber 41, and hollow member or tube 26a also tends to close the valve.

In the case of that modification of the invention shown in Figs. 1 and 2, it should be noted that the valve 21 will open in case of a very great reduction of pressure in the tank 1, if the nut 34 is adjusted so as not to cause the spring 33 to exert too great a pressure. This is a feature of advantage in that it will save the walls of the boiler 1 from buckling, and although the nut 34 may be adjusted so that the device will or will not have this functional attribute, according to the requirements of the particular system into which the device of my invention is incorporated, I wish to claim this feature herein.

It is obvious that many changes may be made in the various parts of my invention without departing from the scope thereof, and while I have referred to the parts 27 and 44 as "bellows", it is apparent that any expansible chamber might be substituted therefor. Many of the features of construction are advantageous and will be found to be covered in the appended claims but as to the claims which do not specify the details of construction, it should be understood that equivalents include any mechanism operating in like fashion thermostatically or thermodynamically, since the invention involves many new functional attributes that could be attained in many different ways, and in this respect purely mechanical features are not of the essence.

I claim,

1. In apparatus of the class described, the combination with a valve, of vaporization pressure means to open said valve, said vaporization pressure means acting by vaporization of a fluid independent of the fluid in the system but being subject to the pressure in the system associated with said apparatus, and means for so controlling said vaporization pressure means as to prevent substantial variation in the temperature at which said valve opens, despite variation in the pressure in said system.

2. In apparatus of the class described, the combination with a valve, and vaporization pressure means to open said valve, said vaporization pressure means being subject to the pressure in the system associated with said apparatus, of means for exerting an additional constant pressure on said vaporization means, whereby to control said vaporization pressure means so as to prevent substantial variation in the temperature at which said valve opens, despite variation in the pressure in said system.

3. In apparatus as claimed in claim 1, the combination with the elements therein specified, of additional means responsive to excessive pressure in the system for opening the valve.

4. In apparatus as claimed in claim 2, the combination with the elements therein specified, of additional means responsive to excessive pressure in the system for opening the valve.

5. In apparatus of the class described, a normally closed valve element adapted to open against pressure, a stationary element, chamber means having a portion thereof movable with relation to the whole and connected to said valve element, the other portion being connected to said stationary element, a liquid in said chamber whose boiling point under normal pressures is lower than that of water under normal pressures, and means to exert a substantially constant pressure on the liquid in said chamber in addition to the pressure exerted thereon from the system with which the apparatus is associated and through said valve element, whereby to reduce the proportional variation in pressure on the liquid.

6. In apparatus of the class described, a normally closed valve element adapted to open against pressure, a stationary element, chamber means having a portion thereof movable with relation to the whole and connected to said valve element, the other portion being connected to said stationary element, the effective area of the movable portion of said chamber means being greater than the effective area of the valve element, a liquid in said chamber whose boiling point under normal pressures is lower than that of water under normal pressures, and means to exert a substantially constant pressure on the liquid in said chamber in addition to the pressure exerted thereon from the system with which the apparatus is associated through said valve element, whereby to greatly reduce the proportional variation in pressure on the liquid and yet cause the liquid to boil at or near the normal boiling point of water.

7. In apparatus of the class described, a casing provided with two chambers with an inlet entering one chamber and a discharge outlet from the other chamber, a normally closed valve between said chambers, a thermostatic device to open said valve, resilient means opposing the opening of said valve, said device being caused to operate by the temperature in one of said chambers, the temperature acting to increase the pressure in that part of the device that is located in the other chamber.

8. In apparatus of the class described, a casing provided with two chambers with an inlet entering one chamber and a discharge outlet from the other chamber, a normally closed valve between said chambers, and thermostatic means located in both of said chambers to actuate said valve, whereby to permit free circulation of the fluid in a system to which the apparatus is attached around the thermostatic means.

9. In apparatus of the class described, a casing provided with two chambers with an inlet entering one chamber and a discharge outlet from the other chamber, a valve between said chambers, thermostatic means to operate said valve, and additional fusible means acting through said thermostatic means to also operate said valve.

10. In apparatus of the class described, a temperature relief valve adapted to discharge fluid from a system upon the attainment of excessive temperatures, a thermostatic device to actuate said valve, and means to admit the pressure fluid in the system into the thermostatic device so that the valve will open and remain open when the temperature in the valve reaches a predetermined point.

11. In apparatus of the class described, a valve, a thermostatic device operated by pressure of an expansible fluid therein adapted to open said valve under conditions of excessive temperature, the said pressure being exerted on a larger area than the area of the orifice of the valve, and a seat for the valve arranged to open under conditions of excessive pressure in the system in connection with which the apparatus is employed.

12. In apparatus of the class described, a pair of elements comprising a valve and a valve seat both of which are movable, diaphragm means adapted to be operated by pressure associated with one of said elements, and thermostatic means adapted to be operated by a change of temperature associated with the other of said elements, whereby the valve will open upon a rise of pressure or a rise in temperature.

13. In apparatus of the class described, the combination with the parts specified in claim 12 adapted to operate as therein set forth, of a fusible plug adapted to admit the fluid under pressure in the system into the thermostatic means upon the attainment of very high temperature, whereby to open the valve.

14. In apparatus of the class described, an expansible chamber, a stationary element, a hollow member having rigid walls, one end of the chamber being attached to the stationary element and the other end of the chamber being attached to the hollow member, the interior of the chamber and the hollow member being in communication, a liquid in the hollow member and the chamber, a valve member operatively connected to the hollow member, and resilient means exerting a pressure against the chamber and tending to close the valve, whereby the liquid in the hollow member or the chamber is subjected to a constant pressure in addition to whatever pressure may be exerted upon it by the system in connection with which the apparatus is used.

15. In apparatus as claimed in claim 14, the combination with the parts and elements therein specified, of an additional diaphragm associated with an element of the valve, whereby the valve may be opened at a predetermined pressure.

16. In apparatus of the class described, an expansible member, a hollow member having rigid walls connected to said expansible member and having a volumetric capacity such as to materially add to the volumetric capacity of the expansible member, normally closed valve means connected to one of said members, a liquid in the hollow member and expansible member, whereby expansion of the liquid under increased temperature will open the valve, the displacement of the valve being measurably increased by the additional volumetric capacity afforded by the hollow member.

17. In apparatus as claimed in claim 16, the combination with the parts and elements therein specified, of a fusible plug associated with the hollow member, whereupon fluid from a system in connection with which the apparatus is used will flow directly into the hollow member and expansible member upon attainment of the predetermined temperature, thereby to operate the valve.

18. In apparatus of the class described, an expansible chamber, a stationary element, a hollow member having rigid walls, one end of the chamber being attached to the stationary element and the other end of the chamber being attached to the hollow member, the interior of the chamber and the hollow member being in communication, a liquid in the hollow member and the chamber, a valve member operatively connected to the hollow member, resilient means exerting a pressure against the chamber, whereby the liquid in the hollow member or the chamber is subjected to a constant pressure in addition to whatever pressure may be exerted upon it by the system with which the apparatus is used, a diaphragm associated with the valve, resilient means pressing against said diaphragm, whereby the valve may be opened under excessive pressure, and a fusible plug associated with the hollow member, whereby the valve will open at a definite temperature within a small range by reason of vaporization of the liquid, will open by reason of excessive pressure, and will open wide upon a great increase in temperature when the fusible plug melts.

19. In apparatus of the class described, an expansible chamber, a hollow member having rigid walls, of a volumetric capacity substantially greater than that of the chamber, a valve associated with these parts adapted to be opened upon relative movement of the chamber and the hollow member, a liquid nearly but not quite filling the hollow member and the chamber, there being a vacuum of small but definite proportions included within them whereby upon heating of the elements so far described the liquid will expand and fill both chamber and hollow member and cause opening of the valve, the movement of the valve being magnified by the excessive volumetric capacity provided by the hollow member.

20. In apparatus as claimed in claim 19, the combination with the parts and elements therein specified, of a diaphragm associated with an element of the valve, and resilient means pressing against it, whereby the valve may be opened at a predetermined pressure.

21. In apparatus as claimed in claim 19, the combination with the parts and elements therein specified, of a fusible plug associated with the hollow member, whereby fluid from a system in connection with which the apparatus is used may reach into the hollow member and cause opening of the valve wide at the attainment of a predetermined temperature.

22. In apparatus as claimed in claim 19, the combination with the parts and elements therein specified, of means for delicately adjusting one end of the expansible chamber, the other end thereof being held in a definite position by the other parts of the apparatus prior to opening of the valve, thus permitting the amount of vacuum in the parts to be delicately controlled, whereby to adjust accurately the temperature at which the valve will open.

23. In apparatus of the class described, a casing, an expansible chamber, adjustable means connecting the top of said chamber to the casing, a tube connected to the bottom of the chamber, a valve comprising a valve disk attached to the tube, a diaphragm, and a valve seat, the valve seat being located on the diaphragm and the valve seat surrounding the tube whereby the valve will open in one direction to relieve a system to which the apparatus is attached upon the attainment of excessive temperature, and the valve will open in the other direction upon the attainment of excessive pressure in said system.

24. In apparatus as claimed in claim 23, the combination with the parts therein specified, of spring means associated with the diaphragm.

25. In apparatus as claimed in claim 23, the combination with the parts therein specified, of spring means pressing against the diaphragm and adjustable means backing up said spring means.

26. In apparatus as claimed in claim 23, the combination with the parts therein specified, of a cage in said casing, said cage having an annular portion surrounding the tube to steady it.

27. In apparatus as claimed in claim 23, the combination with the parts therein specified, of a cage attached to the casing, said cage having an annular portion surrounding the tube, a nut in screw threaded engagement with said portion, and a spring surrounding the tube and engaging the diaphragm and nut, whereby adjustable pressure may be exerted against the diaphragm portion of the valve.

28. In apparatus as claimed in claim 23, the combination with the parts therein specified, of a cage attached to the casing, an annular portion forming part of the cage and surrounding the tube, a nut in threaded engagement with the annular portion, and a spring surrounding the tube and pressing against the expansible chamber and the nut, whereby to exert a variable pressure against the expansible chamber.

29. In apparatus as claimed in claim 23, the combination with the parts therein specified, of a cage attached to the casing, and having an annular portion surrounding the tube, arms constituting part of the cage, nuts in engagement with said annular portions on either side of the arms of the cage, springs surrounding the tube and in engagement at one end with said nuts and at the other end with the expansible chamber and diaphragm respectively, whereby to provide for adjustable pressure against the expansible chamber and an adjustable pressure against the diaphragm.

30. In apparatus as claimed in claim 23, the combination with the parts therein specified, of spring means pressing against the diaphragm, and stops limiting the downward movement of said diaphragm, whereby said spring means has no effect on the expansible chamber.

31. In apparatus of the class described, a valve element, a stationary element, chamber means having a portion thereof movable with relation to the whole and connected to said valve element, the other portion being connected to said stationary element, said chamber means being adapted to receive a liquid whose pressure of vaporization under an increased temperature will cause said valve element to be moved, the effective area of the movable portion of the chamber being greater than the effective area of said valve element, whereby the pressure per unit of area on the movable portion of the chamber will be less than it is on the valve element, an additional valve element cooperating with the first named valve element to form a complete valve, and means responsive to excessive pressure in the system for moving one of said valve elements to open the valve.

32. In apparatus of the class described, a valve element, a stationary element, chamber means having a portion thereof movable with relation to the whole and connected to said valve element, the other portion being connected to said stationary element, resilient means tending to collapse said chamber, said chamber means being adapted to receive a liquid whose pressure of vaporization under an increased temperature will cause said valve element to be moved, whereby the pressure on said valve element is merged in the force exerted by said resilient means, whereby the total variation in pressure on said chamber will vary less in proportion than the variation of the pressure on the valve element due to variation in pressure in the system with which the apparatus is associated, an additional valve element cooperating with the valve element already mentioned to form a complete valve, and means responsive to excessive pressure in the system for moving one of said valve elements to open the valve.

33. In apparatus of the class described, a valve element, a stationary element, chamber means having a portion thereof movable with relation to the whole and connected to said valve element, the other portion being connected to said stationary element, a liquid in said chamber whose boiling point under normal pressures is lower than that of water under normal pressures, means to exert a substantially constant pressure on the liquid in said chamber in addition to the pressure exerted thereon from the system with which the apparatus is associated and through said valve element, whereby to reduce the proportional variation in pressure on the liquid, an additional valve element cooperating with the aforementioned valve element to form a complete valve, and means responsive to excessive pressure in the system for moving one of said valve elements to open the valve.

34. In apparatus of the class described, a valve element, a stationary element, chamber means having a portion thereof movable with relation to the whole and connected to said valve element, the other portion being connected to said stationary element, the effective area of the movable portion of said chamber means being greater than the effective area of the valve element, a liquid in said chamber whose boiling point under normal pressures is lower than that of water under normal pressures, means to exert a substantially constant pressure on the liquid in said chamber in addition to the pressure exerted thereon from the system with which the apparatus is associated through said valve element, whereby to greatly reduce the proportional variation in pressure on the liquid and yet cause the liquid to boil at or near the normal boiling point of water, an additional valve element cooperating with the aforementioned valve element to form a complete valve, and means responsive to excessive pressure in the system for moving one of said valve elements to open the valve.

35. In apparatus of the class described, a self-contained temperature and relief valve, comprising a movable valve member, a movable seat member for said valve member, means responsive to temperature changes in the system in connection with which the valve is used to operate said movable valve member, thereby to open an orifice between the pressure and relief sides of said valve, and means normally holding said seat member against said valve member, said seat member being movable in response to pressure changes in the system in connection with which the valve is used, thereby to open the above orifice between the pressure and release sides of said valve by movement of said seat member.

36. In a safety relief device for hot water apparatus, the combination with a hollow chamber adapted to have open communication with the hot water supply, said chamber being provided with a waste port and a valve normally closing said port to prevent the waste of hot water therethrough, a temperature-responsive valve-opening actuator located outside of said chamber in position to be subject to heat transmitted from the hot water in the chamber but not subject to the pressure of said water whereby a predetermined excess of temperature of the water in the chamber causes the actuator to fully open said valve and permit the waste of the hot water.

37. In a safety relief device for hot water apparatus, the combination with a hollow casing having a chamber adapted to have open communication with the hot water supply, said chamber being provided with a waste port, a valve normally closing said port, a vapor tension thermostat valve actuator located on the outside of said chamber and in contact with said casing without being subjected to the pressure of the water in said chamber whereby at a predetermined temperature of water in the chamber the thermostat is expanded to open said valve and allow the waste discharge of the water so long as the temperature of the water remains excessive.

38. In a safety relief device for hot water apparatus, the combination of a hollow casing having a chamber adapted to have communication with a hot water supply, said chamber being provided with a waste port affording a waste outlet for said chamber into a waste passage, a valve normally closing said waste port, and a thermostat located in said waste passage and arranged, when expanded by the temperature of the casing, to open said valve and allow the water to waste through said thermostat containing passage.

39. A relief valve device having a valve casing which has a waterway for water of which the temperature rises and falls and having a drainway for spill water, a partition separating the waterway and the drainway and having a valve port, a sylphon chamber arranged on the drainway side of the valve port and inside and in heat conducting relation to the valve casing, a sylphon bellows in said chamber, and a valve arranged on the waterway side of the port and connected with the sylphon bellows and adapted in closed position to exclude water from the sylphon bellows.

CHETWOOD SMITH.